March 31, 1970  E. F. LABUDA  3,504,297
BROAD BAND MASER DEVICES
Filed April 4, 1966

INVENTOR
E. F. LABUDA
BY
R. B. Anderson
ATTORNEY

3,504,297
BROAD BAND MASER DEVICES
Edward F. Labuda, Madison, N.J., assignor to Bell Telephone Laboratories, Incorporated, New York, N.Y., a corporation of New York
Filed Apr. 4, 1966, Ser. No. 539,893
Int. Cl. H01s 3/22
U.S. Cl. 331—94.5                                                                                              6 Claims

ABSTRACT OF THE DISCLOSURE

The bandwidth of a gas optical maser is increased by using as the gaseous active medium equal parts of a plurality of isotopes of the same material. For example, in a helium-neon maser, equal parts of $neon^{20}$ and $neon^{22}$ are used; in an argon maser, equal parts of $argon^{36}$, $argon^{38}$, and $argon^{40}$ are used.

---

This invention relates to maser devices, and more particularly, to broad band optical masers or lasers which are capable of generating or amplifying light energy.

The laser, also known as the optical maser, is a development of far-reaching technological importance because of its ability to amplify light and to generate coherent oscillations at light frequencies. Through a selective excitation mechanism known as pumping, an abnormally high proportion of atoms or other particles within an active medium of the laser is raised to a high unstable energy state or level, defining a condition known as population inversion. As the particles decay to lower energy levels, they inherently emit radiation at characteristic frequencies.

The active medium in a gas laser is a gas plasma, the components of which are excited by establishing a gas discharge. In some gas lasers, the population inversion is produced between two energy levels of the neutral component atoms of the gas plasma which may typically be a mixture of helium and neon through which a gas discharge is maintained. As described in the application of E. I. Gordon and E. F. Labuda, Ser. No. 385,159, filed July 27, 1964, assigned to Bell Telephone Laboratories, Incorporated, higher power outputs can be realized if the population inversion is produced between two energy levels of the component ions of the gas plasma rather than the neutral atoms. The active medium of ion lasers is usually one of the noble gases such as argon, although laser oscillation has been achieved in ionic species of elements other than the noble gases. For both neutral atom lasers and ion lasers, the gas discharge can be maintained by applying a radio frequency electric field, or alternatively by establishing a direct current between an anode and a cathode, as is done in conventional gas discharge tubes. In either case, the gas discharge region is normally defined by an extended tubulation, the axis of which will be coincident with the light beam generated or amplified.

The desired laser action results from in-phase radiation by a large number of excited atoms as they decay to a lower energy state. As the atoms or ions decay, they emit a small band of frequencies centered at a characteristic frequency determined by the energy levels of the laser transition. The frequency bandwidth of energy emitted by the atoms or ions is determined by various perturbing effects. In gas lasers, the dominant perturbing effect is the thermal motion of the atoms or ions which leads to a frequency width known as a Doppler width. The frequency bandwidth over which laser oscillation or amplification can be obtained in gas lasers is limited by the Doppler width of the laser transition.

In many instances, it would be desirable to increase the frequency bandwidth over which laser oscillation or amplification can be obtained. For various spectral studies, for example, it would be desirable to provide a single mode laser oscillator the output of which could be swept across a fairly broad frequency range. This would be useful in determining the absorption properties of certain materials at different frequencies, and for studying the properties of gas plasmas. For certain optical communication sytsems, both broadband oscillators and amplifiers would be desirable. As will be explained later, in a mode locked laser of the type described in the application of L. E. Hargrove, Ser. No. 362,319, filed Apr. 24, 1964, now U.S. Patent 3,412,251, assigned to Bell Telephone Laboratories, Incorporated, it is in some cases advantageous to increase the bandwidth over which the laser oscillation is obtained.

Accordingly, it is an object of this invention to increase the optical frequency bandwidth of lasers.

This and other objects of the invention are attained in an illustrative embodiment thereof comprising a gas laser which operates as described above. In accordance with the invention, the active medium of the laser comprises equal parts of different gas isotopes. The active medium of ion lasers may, for example, consist of equal parts of the three stable argon isotopes, $argon^{36}$, $argon^{38}$, and $argon^{40}$. Alternatively, in neutral gas lasers it may comprise a mixture of helium together with equal parts of $neon^{20}$ and $neon^{22}$ isotopes.

Different isotopes of the same gas laser material have different center frequencies in their Doppler broadened gain versus frequency profiles. As will be explained later, using equal amounts of the different isotopes effectively combines the Doppler broadened gain versus frequency profiles of the isotopes to increase the bandwidth over which the laser is capable of generating or amplifying light.

In accordance with another embodiment of the invention, equal parts of the isotopes of the same material are used in the active medium of a mode-locked laser of the type described in the aforementioned Hargrove application. The purpose of the mode-locked laser is to obtain a power output in the form of sharply defined pulses. By broadening the bandwidth, or the gain versus frequency profile, of the active medium, the output pulses are more sharply defined and are of higher peak power than would otherwise be the case.

These and other objects and features of my invention will be better understood from a consideration of the following detailed description, taken in conjunction with the accompanying drawing in which.

Figure 1:
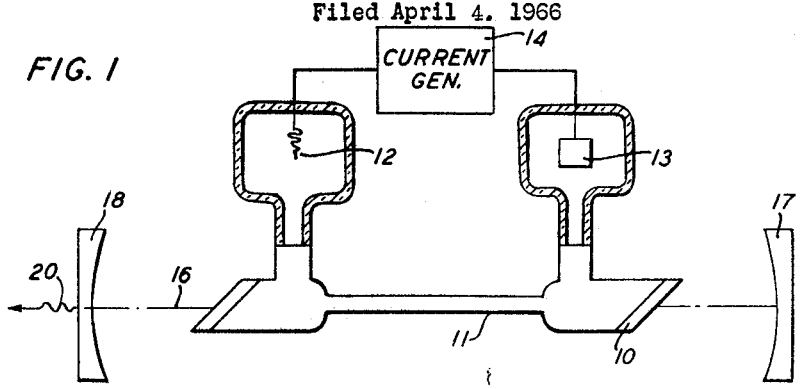
FIG. 1 is a schematic illustration of a single frequency gas laser in accordance with one embodiment of the invention.

Referring now to FIG. 1, there is shown a laser 10 comprising an elongated tube 11 which contains a gaseous active medium. A gas discharge is established in tube 11 between a cathode 12, and anode 13 which are connected to a current generator 14. The energy supplied by generator 14 creates a population inversion in the energy level system of the active medium as is required for generating or amplifying light energy. The laser 10 is located along an optic axis 16 within an optical cavity defined by mirrors 17 and 18. Mirror 18 is partially transmissive, so that light energy can be coupled out of the apparatus as shown by the arrow 20.

The general construction, operation, and various uses of, the laser of FIG. 1 are well known in the art. With an inner diameter of tube 11 of 2 millimeters, the active medium may be a mixture of helium and neon at a pressure of 1.8 torr (millimeters of mercury). The ratio of helium to neon in lassers of this type is typically 7 to 1 so that the partial pressure of the helium is $\frac{7}{8} \times 1.8$ torr, while the partial pressure of neon is $\frac{1}{8} \times 1.8$ torr. The apparatus of FIG. 1 can be used either for generating light energy which is derived along path 20, or for amplifying light energy that is projected along path 16.

In accordance with the invention, the neon component of the gaseous active medium consists of equal parts of the neon isotopes, neon[20] and neon[22]. By this provision, the bandwidth of optical frequencies that can be generated or amplified by the laser 10 is substantially increased. Curves 22 and 23 respectively illustrate the Doppler-broadened gain versus frequency profiles of neon[20] and neon[22]. If the neon component of the laser of FIG. 1 were entirely neon[20], the laser gain would vary with optical frequency as shown by curve 22, while if it were neon[22], curve 23 would represent the gain versus frequency profile. By using equal quantities of the two isotopes, the gain versus frequency profile of the laser is defined by the curve 24 which is essentially a composite of curves 22 and 23. It can be seen from curve 24 that the laser of FIG. 1 gives a usefully high gain over a substantially wider optical frequency range than would be the case if either curve 22 or 23 represented the gain profile. If the laser is used as an amplifier, it will therefore give useful amplification over broader bandwidths.

It is preferred that the laser of FIG. 1 be a single mode laser, that is, that at any given time, laser gain occurs only at one frequency. Competing oscillation modes of the optical cavity can be suppressed, for example, by the arrangement described in the application of A. D. White, Ser. No. 514,488, filed Dec. 17, 1965, now U.S. Patent 3,435,371, assigned to Bell Telephone Laboratories, Incorporated. Alternatively, the optical cavity can be designed so that only one oscillation mode occurs within the frequency range of useful gain. Of course, in amplifiers that do not include optical cavities, there is no competing mode problem.

Figure 2:
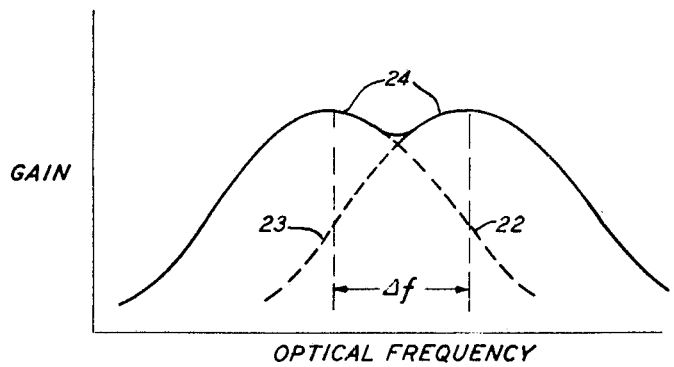
FIG. 2 illustrates the Doppler-broadened gain versus frequency profile of the illustrative laser of FIG. 1.

When a single mode laser is being used for spectral studies, the bandwidth over which a usefully high optical gain occurs is known as the frequency sweep range of the laser. It can be shown that the frequency sweep range of a conventional single isotope helium-neon laser operating at a wavelength of 6328 angstroms is approximately 1.5 kilomegacycles per second. With equal parts of neon[20] and neon[22], as described above, the sweep range is increased to approximately 2.5 kilomegacycles per second. This increase occurs because the difference frequency $\Delta f$ of the center frequencies of the two isotopes, as shown in FIG. 2, is approximately 1.0 kilomegacycle per second. As is known, the output frequency of the laser can be changed by varying the length of the optical cavity. For this use, one of the mirrors is preferably mounted on a piezoelectric member; its axial position is then controlled by the voltage on the piezoelectric member.

It can be appreciated that equal quantities of the different isotopes of the same material should be used for attaining a fairly constant gain over a relatively broad frequency range. Hence, in the example given above, the partial pressures of neon[20] and neon[22] should each be $\frac{1}{16} \times 1.8$ torr. The neon isotopes are commercially available and their partial pressures can be accurately controlled in a known manner through the use of appropriate measuring devices such as the capacitance manometer. It should be noted that the term partial pressure as used herein is synonymous with gas number density.

The invention is likewise useful in lasers other than helium-neon lasers. For example, the ion laser of the aforementioned Gordon et al. application is a gas discharge device which may typically use as the active medium argon at a pressure of .45 torr. The bandwidth of this device can be substantially increased by using equal parts of the argon isotopes, argon[36], argon[30], and argon[40].

Hence, each of the argon isotopes should have a partial pressure of approximately .15 torr. Different isotopes of other specific active medium materials can also be used for frequency broadening. However, isotopes of different materials cannot be used as described above because the center frequencies of the Doppler-broadened gain versus frequency profiles of different materials are too widely separated to give a reasonably constant or continuous composite gain versus frequency profile.

Figure 3:
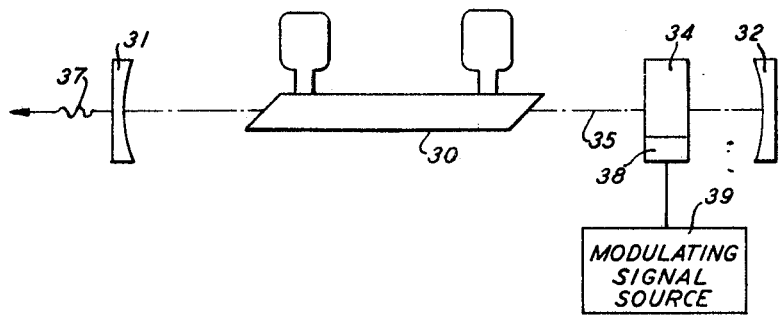
FIG. 3 is a schematic illustration of another embodiment of the invention.

The invention gives special advantages in a mode-locked laser apparatus of the type shown in FIG. 3, and described in detail in the aforementioned Hargrove application. The mode-locked laser apparatus comprises a conventional laser 30 located within an optical cavity defined by mirrors 31 and 32. A light wave modulator 34 is included along optical path 35 in close proximity to mirror 32 for coupling together the various longitudinal oscillation modes within the optical cavity for mutual reinforcement. With proper coupling in accordance with the principles of the Hargrove application, output light energy 37 is derived from the apparatus in the form of sharply defined pulses of higher peak amplitude than would otherwise be obtained.

In accordance with the principles of the Hargrove application, the modulator 34 comprises a block of material such as fused quartz having a refractive index that is a function of applied acoustic energy. A transducer 38 connected to a high frequency signal source 39 excites a standing acoustic wave in the quartz block at a modulating frequency of $c/2L$, where $c$ is the velocity of light and $L$ is the effective length of the optical cavity. The standing acoustic wave acts as a diffraction grating to modulate the optical energy traveling along path 35. If the acoustic signal power is above a threshold level, modulation inherently results in a coupling of the longitudinal oscillation modes of the cavity to give the desired output described above. Modulation at frequency $c/2L$ in this manner is known as synchronous modulation.

The output energy 37 is in the form of pulses having a repetition rate equal to the modulating frequency. It is usually desirable that the pulses be as sharply defined as possible; that is, that the time duration of each pulse be minimized. It can be shown that the pulse width or duration is inversely proportional to the number of longitudinal oscillation modes established in the optical cavity and that the peak power output is directly proportional to the number of modes. The number of oscillation modes, in turn, is an increasing function of the bandwidth of the laser 30. Hence, in accordance with my invention, equal quantities of the isotopes of the same material are used in the active medium of laser 30 to increase the efficiency of the mode-locked laser apparatus of FIG. 3.

The devices shown and described are presented merely as illustrative examples of the invention and the benefits that can be derived therefrom. Various other modifications and embodiments can be made without departing from the spirit and scope of the invention.

What is claimed is:

1. In a maser of the type in which coherent high frequency energy can be generated through the controlled inversion of the population of energy states within an active medium, the improvement comprising:
   an active medium substantially consisting of substantially equal parts of a plurality of isotopes of the same material, whereby the frequency bandwidth of the maser is increased.

2. The improvement of claim 1 wherein:
   the active medium comprises a mixture of helium and equal parts of neon[20] and neon isotopes.

3. The improvement of claim 1 wherein:
   the active medium comprises equal parts of argon[36], argon[38], and argon[40] isotopes.

4. In a maser of the type in which optical oscillatory energy is generated comprising a laser oscillator which includes a gaseous active medium disposed within an optical cavity, means located within the cavity for synchronously modulating the oscillatory energy above the threshold level required to produce longitudinal mode locking, and means for deriving optical energy from the cavity, the improvement wherein:

the gaseous active medium substantially consists of substantially equal parts of a plurality of isotopes of the same material.

5. The improvement of claim 4 wherein:
the active medium comprises a mixture of helium and equal parts of neon[20] and neon[22] isotopes.

6. The improvement of claim 4 wherein:
the active medium comprises equal parts of argon[36], argon[38], and argon[40] isotopes.

References Cited

"Method of Measuring Small Isotopic Displacements in Infrared Stimulated Emissions" (in French), J. Brochard & R. Uetter, C. R. Acad. Sc. Paris, vol. 262, Mar. 7, 1966, pp. B–681 to B–684.

"Measurements of Argon Single-Frequency Laser Power and the 6328 A. Neon Isotope Shift Using an Interferometer Laser," P. Zory, J. Appl. Pays, 37, September 1966, pp. 3643–4.

"Isotope Shift Measurement for 6328 A. He-Ne Laser Transition," R. Codover et al., Appl. Phys. Lett. 7 (12), Dec. 15, 1965, pp. 322–324.

"Single Mode Tuning Dip in the Power Output of an He-Ne Optical Maser," R. McFarlane et al., Appl. Phys., Lett, 2 (10), May 15, 1963, pp. 189–190.

"Isotope Shift and Saturation Behavior of the 1.15-M Transition of Ne," Phys. Rev. Lett., 10 (12), June 15, 1963, pp. 521–24. (Auth: A. Szoke.)

RONALD L. WIBERT, Primary Examiner

R. J. WEBSTER, Assistant Examiner

U.S. Cl. X.R.

250—199